United States Patent [19]

Nakashima et al.

[11] Patent Number: 5,386,923
[45] Date of Patent: Feb. 7, 1995

[54] JOINT STRUCTURE OF CONTAINER AND PIPE

[75] Inventors: Hitoshi Nakashima; Seiichi Fujino; Kenji Ishiwari, all of Hiroshima, Japan

[73] Assignee: Kurata Corporation, Hiroshima, Japan

[21] Appl. No.: 187,904

[22] Filed: Jan. 28, 1994

[51] Int. Cl.⁶ .............................................. B65B 3/00
[52] U.S. Cl. ............................ 220/86.2; 285/286; 285/332; 285/906; 285/158; 285/382.2
[58] Field of Search ............... 285/158, 921, 286, 332, 285/382.2, 906; 220/86.1, 86.2, 86.3

[56] References Cited

U.S. PATENT DOCUMENTS

| | | | |
|---|---|---|---|
| 2,388,177 | 10/1945 | Patterson et al. | 285/158 X |
| 2,764,427 | 9/1956 | Andrus | 285/158 X |
| 2,779,498 | 1/1957 | Cole et al. | 285/158 X |
| 3,209,991 | 10/1965 | Sauber | 285/158 X |
| 3,425,452 | 2/1969 | Shaw | 285/158 X |
| 4,610,285 | 9/1986 | Bartholomew | 285/921 X |
| 4,733,890 | 3/1988 | Vyse | 285/158 X |
| 4,974,645 | 12/1990 | Johnson | 220/86.2 X |

*Primary Examiner*—Dave W. Arola
*Attorney, Agent, or Firm*—Sixbey, Friedman, Leedom & Ferguson

[57] ABSTRACT

A breather pipe mounted to a fuel tank is divided into an outer pipe and an inner pipe, a flange is integrally formed at an end part of the outer pipe on the tank side, then the flange is projection-welded to a wall part of the fuel tank, ensuring a sealability. An upper end of the inner pipe is inserted and held to a lower end of the outer pipe in the fuel tank, and the outer pipe and the inner pipe are sealed by a sealing member, tapering joint or caulking joint. Thus, the sealability at the joint part is ensured, while enhancing a joint strength without soldering which involves pollution.

10 Claims, 5 Drawing Sheets

JOINT STRUCTURE OF CONTAINER AND PIPE

BACKGROUND OF THE INVENTION

This invention relates to a joint structure of a metallic pipe to a metallic container, and particularly relates to a joint structure of a breather pipe to a fuel tank for a vehicle or the like.

A metallic breather pipe for adjusting pressure in a metallic fuel tank and detecting fuel supply amount at fuel supply is mounted to the fuel tank for a vehicle or the like together with an inlet pipe for fuel supply. The breather pipe is jointed to the tank in such a fashion that a part thereof is inserted in the fuel tank. An end part of the pipe which is inserted in the fuel tank is opened at an upper limit of liquid level of fuel in the fuel tank. The other end part of the breather pipe is connected to a vicinity of a fuel injection mouth of the inlet pipe.

The metallic breather pipe is conventionally jointed to the metallic fuel tank in such a manner that: a flange is mounted at a middle part of the breather pipe; the flange is jointed to the tank by, for example, spot welding; then an entire periphery of the pipe at jointed part is sealed by using a solder for keeping a sealed condition between the breather pipe and the tank.

Japanese Patent Publication No. 63-36878 discloses a technique that: an expanded part (flange or flare) is formed at one end of a metallic pipe and a through hole is formed at a part of a metallic plate at which the metallic pipe is jointed; the metallic pipe is inserted through the through hole of the metallic plate; then the expanded part of the metallic pipe is jointed to the inner periphery of the through hole by projection welding. This reference relates to the joint of the end part of the metallic pipe to one side surface of the metallic plate, which means that there is no disclosure about the joint structure that the metallic pipe passes through and is joined at the middle part thereof to the metallic plate.

Also, well known is a joint structure of a pipe to a tank that in a fuel tank made of synthetic resin a tubular part opening into the fuel tank is formed and a pipe is inserted in the tubular part. This joint structure is, however, different from the joint technique in which the metallic pipe passes through the wall of the metallic fuel tank.

In the conventional technique that the joint part between the metallic breather pipe and the metallic fuel tank is entirely sealed by a solder, lead in the solder is melt out at a cleaning treatment after the process, which involves increased processing cost for preventing pollution of drain due to cleaning. In addition, soldering for sealing the entire periphery requires skilled persons, which means low productivity.

The inventors in the present invention have tried to ensure the sealability without soldering by welding the flange to the wall of the tank by projection welding after the flange is mounted at a middle part of the metallic breather pipe.

However, in this case, the projection welding can be conducted with an ordinary electrode of a projection welding device only when the electrode is divided.

The present invention has its object of ensuring the sealability and joint strength at joint part of the metallic pipe passing through the wall part of the metallic container with projection welding by using the ordinary electrode.

SUMMARY OF THE INVENTION

To attain the above object, in the present invention, in a joint structure of a metallic container and a metallic pipe extending and passing through a wall part of the container, the metallic pipe comprising:
an outer pipe arranged outside of the container; and
an inner pipe arranged inside of the container and inserted in the outer pipe,
wherein the outer pipe has an integrally formed flange at an end part thereof on a side of the wall part (inside surface or outside surface) of the container,
the outer pipe is mounted at the flange part thereof to the wall part of the container by projection welding,
the inner pipe is held at an end part thereof on the outer pipe side to the wall part of the container or to the outer pipe, and
an inner periphery of the outer pipe and an outer periphery of the inner pipe are sealed by sealing means.

According to the above construction, the metallic pipe is divided into the outer pipe and the inner pipe and the outer pipe is projection-welded to the wall part of the container at the integrally formed flange, thereby sealability between the outer pipe and the wall part of the container is ensured by the projection welding, the joint strength is increased and an excellent load durability of the pipe to the external force is obtained. Further, since the outer pipe and the inner pipe inserted and connected to the outer pipe are sealed by the sealing means, the air-proof is ensured as a whole pipe. The projection welding between the flange and the wall part of the container can be conducted by an ordinary projection welding device. Without soldering, the pollution due to use of solder is avoided.

The sealing means may be a sealing member such as an O-ring.

The sealing means may be composed of a tapered inner peripheral part formed at an inner periphery of an end part of the outer pipe on the flange side so as to increase in inner diameter toward an opening of the end part thereof on the flange side and a tapered outer peripheral part which is formed at an outer periphery of an end of the inner pipe on the outer pipe side so as to decrease in outer diameter toward an opening of the end part thereof on the outer pipe side and which is adhered to the tapered inner peripheral part.

According to the above construction, when the end part of the inner pipe is inserted into the end part of the outer pipe on the flange side, the tapered outer peripheral part of the inner pipe is inserted under an adhered condition into the tapered inner peripheral part of the outer pipe. Thereby, the outer pipe and the inner pipe is sealed without the sealing member such as the O-ring, thus reducing the number of parts and facilitating the assembling of the parts at joint work.

In cases where the sealing means is composed of the tapered inner peripheral part and the tapered outer peripheral part or is composed of the sealing member such as the O-ring, the inner pipe is held to the wall part of the container through the medium of a holding member. In the former case, particularly, the inner pipe may be held by engaging with the outer pipe by an engaging part such as a screw, a bayonet.

The sealing means may be a caulking part formed so that a part of the inner periphery at the end part of the outer pipe on the flange side is adhered and pressed annually, entirely to the outer periphery at the end part of the inner pipe on the outer pipe side.

According to the above construction, since the part of the inner periphery at the end part of the outer pipe on the flange side is pressed and adhered at the caulking part annually, entirely to the outer periphery at the end part of the inner pipe on the outer pipe side, the outer pipe and the inner pipe are sealed without the sealing member such as the O-ring. Further, when the inner periphery of the outer pipe is adhered and pressed to the outer periphery of the inner pipe to the extent that the outer pipe is intruded into the inner pipe, the inner pipe is fixed and held by the outer pipe. In this case, the holding member for the inner pipe is unnecessary, thus further reducing the number of parts and facilitating the assembling of the parts at joint work.

The container is a fuel tank for storing a liquid fuel, and the pipe is a breather pipe extending and passing through the wall part of the fuel tank. Accordingly, the projection welding of the flange of the outer pipe to the wall part of the fuel tank can be conducted, so that the sealability and the joint strength between the outer pipe and the wall part of the fuel tank is ensured, while ensuring the air-proof of the breather pipe as a whole.

PREFERRED EMBODIMENTS OF THE INVENTION

Preferred embodiments of the present invention are described below, with reference to accompanying drawings.

(FIRST EMBODIMENT)

Figure 1:
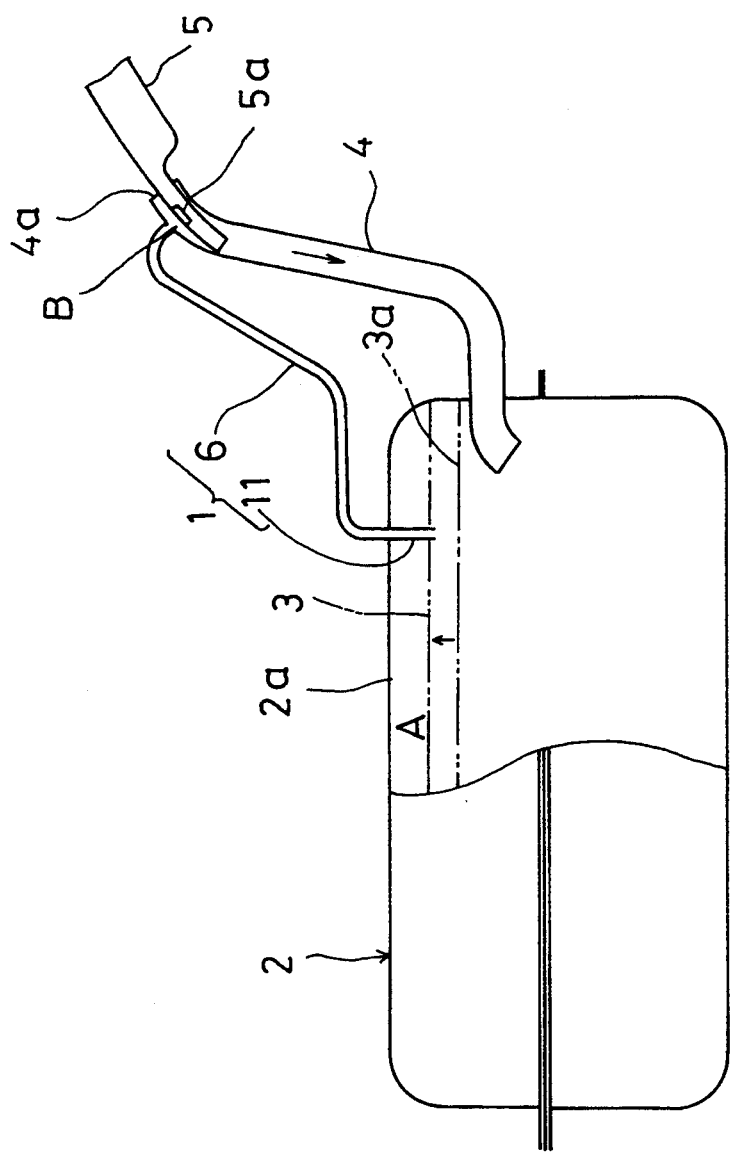
FIG. 1 is a section showing a joint structure of a fuel tank and a breather pipe in a first embodiment of the present invention.
Figure 2:
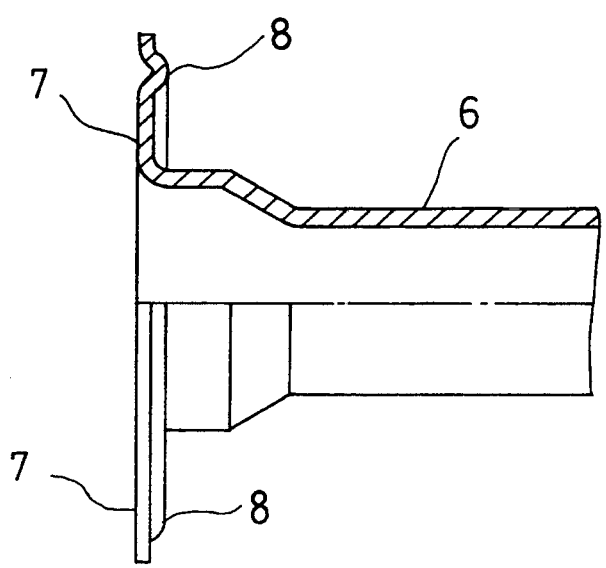
FIG. 2 is an elevation, partly in cutaway view, of an outer pipe.
Figure 3:
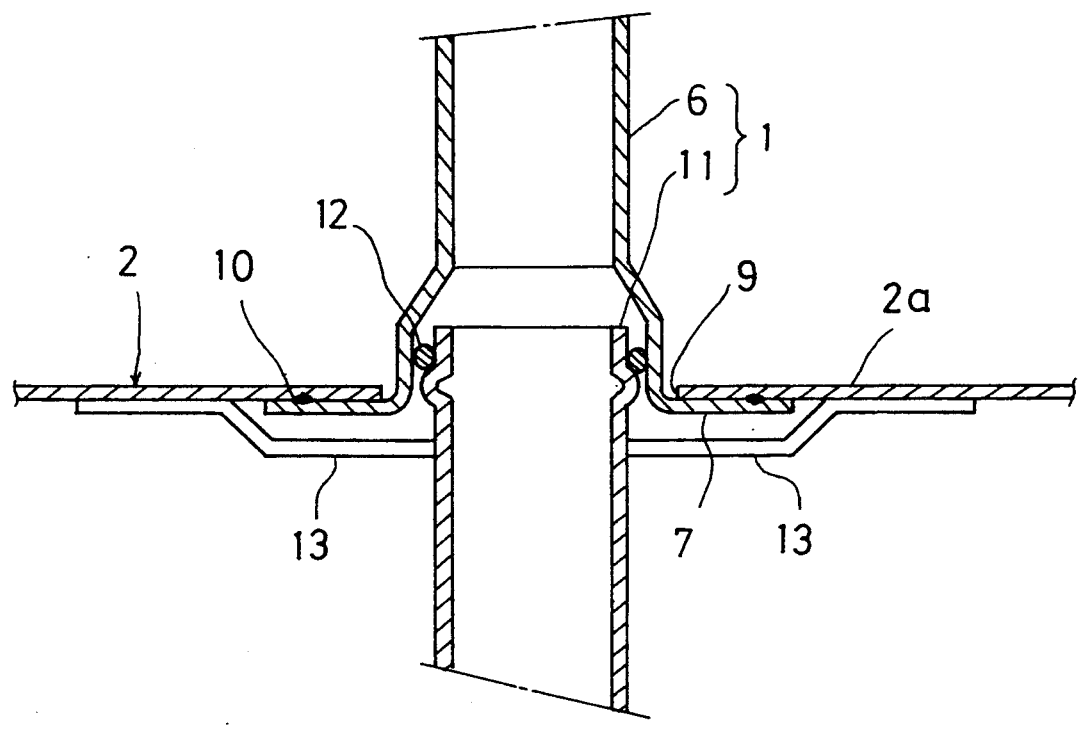
FIG. 3 is a section showing a sealed condition between the outer pipe and an inner pipe.

FIGS. 1-3 shows the first embodiment of the present invention, wherein in FIG. 1, reference numeral 1 designates a breather pipe as a metallic pipe, and 2 designates a fuel tank as a metallic container which are both set up in a vehicle or the like. The breather pipe 1 is jointed to the fuel tank 2 in such a fashion that one end of the breather pipe 1 passes through a wall part 2a of the fuel tank 2 and is opened at an liquid upper limit level 3 in the tank 2. The other end of the breather pipe 1 is communicated with a vicinity of an injection mouth 4a of an inlet pipe 4 for supplying fuel into the fuel tank 2.

Reference numeral 5 designates a fuel supply nozzle, for supplying fuel into the fuel tank 2, which is inserted into the injection mouth 4a of the inlet pipe 4 and has inside thereof a sensor 5a for detecting fuel supply stop. As the fuel is supplied from the nozzle 5 to the tank 2, a liquid level 3a of the fuel in the tank 2 rises. When the liquid level 3a of the fuel reaches to the liquid upper limit level 3, the pressure A in a space above the fuel in the fuel tank 2 is increased to exceed the atmospheric pressure B. At this time, the fuel to be supplied into the fuel tank 2 flows toward the inlet pipe 4 through the breather pipe 1 to be drained out to the vicinity of the injection mouth 4a. The thus drained fuel is detected by the sensor 5a in the fuel supply nozzle 5 inserted into the injection mouth 4a of the inlet pipe 4, whereby the fuel supply is stopped automatically. Therefore, air-proof of the breather pipe 1 and the sealability at the joint part between the breather pipe 1 and the fuel tank 2 must be sufficiently ensured.

The breather pipe 1 is divided into an outer pipe 6 arranged outside of the fuel tank 2 and an inner pipe 11 arranged inside of the fuel tank 2 and inserted, keeping the sealability, into the end part of the outer pipe 6.

As shown in FIG. 2, a flange 7 spread outside is integrally formed at a lower end part of the outer pipe 6 on a side to be jointed to the wall part 2a of the fuel tank 2. Formed for the flange 7 is an annular projection 8 used at projection-welding of the outer pipe 6 to the wall part 2a of the fuel tank 2.

As shown in FIG. 3, a through hole 9 is formed beforehand at the wall part 2a of the fuel tank 2 for passing the breather pipe 1 therethrough. The outer pipe 6 is inserted through the through hole 9 at the wall part 2a of the fuel tank 2 from the inside of the tank 2 toward the outside so as to make the flange 7 contact to the wall part 2a of the tank 2. The flange 7 is jointed to the wall part 2a thereof at the contact part by projection welding.

By the projection welding, the annular projection 8 at the flange 7 is melted to form an annular nugget 10 between the flange 7 and the wall part 2a of the fuel tank 2. The nugget 10 joins firmly the outer pipe 6 and the fuel tank 2, ensuring the sealability between the outer pipe 6 and the fuel tank 2.

An upper end of the inner pipe 11 which is located inside of the fuel tank 2 is inserted and connected to the end part of the outer pipe 6 on the wall part 2a side, e.g. in the lower end part. The inner pipe 11 and the outer pipe 6 are connected so as to compose the breather pipe 1 in series of both pipes 6, 11.

Moreover, between the inner periphery of the outer pipe 6 on the lower end side and the outer periphery of the inner pipe on the upper end side is sealed by a sealing member 12 as sealing means composed of, for example, an O-ring interposed therebetween. The sealing member 12 ensures the sealability as a whole pipe even though the breather pipe 1 is divided into the outer pipe 6 and the inner pipe 11.

The inner pipe 11 extends at the lower end thereof downward to the liquid upper limit level 3 of the fuel in the fuel tank 2. A bracket 13 is provided for holding the upper end of the inner pipe 11 on the outer pipe 6 side to the wall part 2a of the fuel tank 2 so that the inner pipe 11 is held to the wall part 2a of the fuel tank 2 through the medium of the bracket 13. The bracket 13 is composed of plural plates extending peripherally and mounted at an outer peripheral wall of the inner pipe 11. Whole extreme end part of the bracket 13 is jointed to the inner surface of the wall part 2a of the fuel tank 2. The shape and the number of plates of the bracket 13 are optional. Whole extreme end part of the bracket 13 may be jointed to the outer pipe 6.

(SECOND EMBODIMENT)

Figure 4:
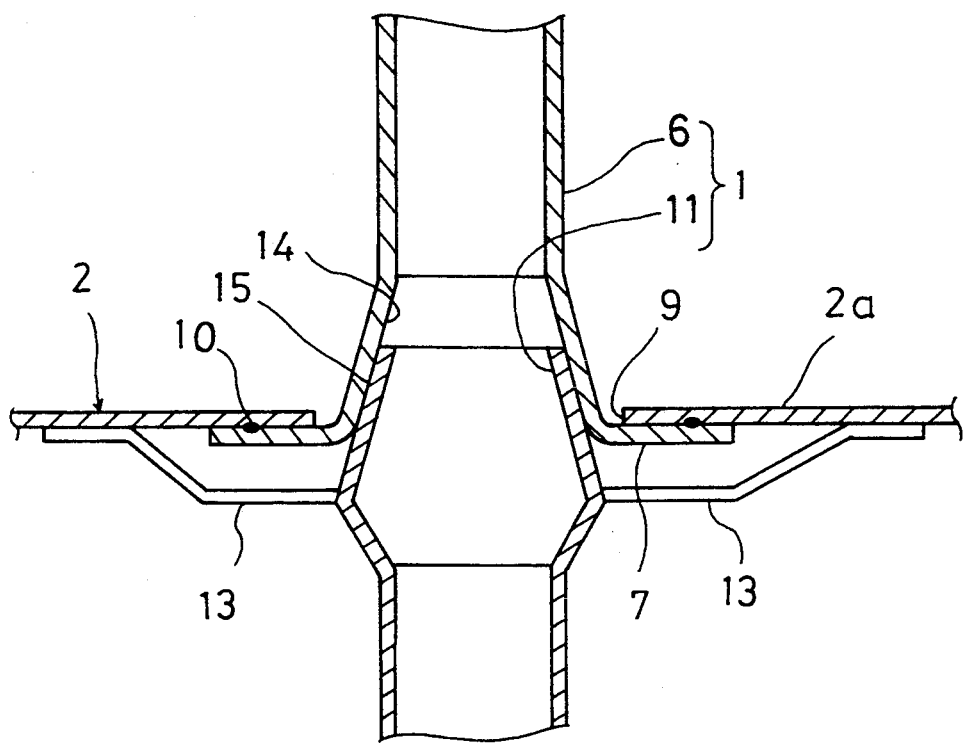
FIG. 4 is a view corresponding to FIG. 3 according to a second embodiment of the present invention.

FIG. 4 shows the second embodiment of the present invention. In FIG. 4, as far as is possible the same reference numerals have been used as in FIG. 3, omitting the explanation thereof.

In this embodiment, the inner periphery at the lower end part of the outer pipe 6 on the wall part 2a side is formed as a tapered inner peripheral part 14 increasing in an inner diameter toward an opening of the lower end part. On the other hand, the outer periphery at the upper end part of the inner pipe 11 which is inserted into the outer pipe 6 is formed as a tapered outer peripheral part 15 decreasing in an outer diameter toward an opening of the upper end part so as to adhere to the tapered inner peripheral part 14. The tapered inner peripheral part 14 and the tapered outer peripheral part 15 serve as the sealing means in the present invention.

As well as in the first embodiment, the flange 7 is integrally formed at the lower end of the outer pipe 6 and mounted to the wall part 2a of the fuel tank 2 by the projection welding, maintaining the sealability.

Accordingly, in this embodiment, as the inner pipe 11 is inserted into the outer pipe 6, the adhesion between the tapered inner peripheral part 14 and the tapered outer peripheral part 15 is performed. This adhesion seals excellently between the inner periphery of the outer pipe 6 and the outer periphery of the inner pipe 11 without the sealing member 12 such as in the first embodiment.

The inner pipe 11 is held to the wall part 2a of the fuel tank 2 or to the outer pipe 6 via the bracket 13, as well as in the first embodiment. In addition, the inner pipe 11 may be held by providing engaging parts such as a screw, a bayonet respectively at respective parts of the tapered inner peripheral part 14 and the tapered outer peripheral part 15.

(THIRD EMBODIMENT)

Figure 5:
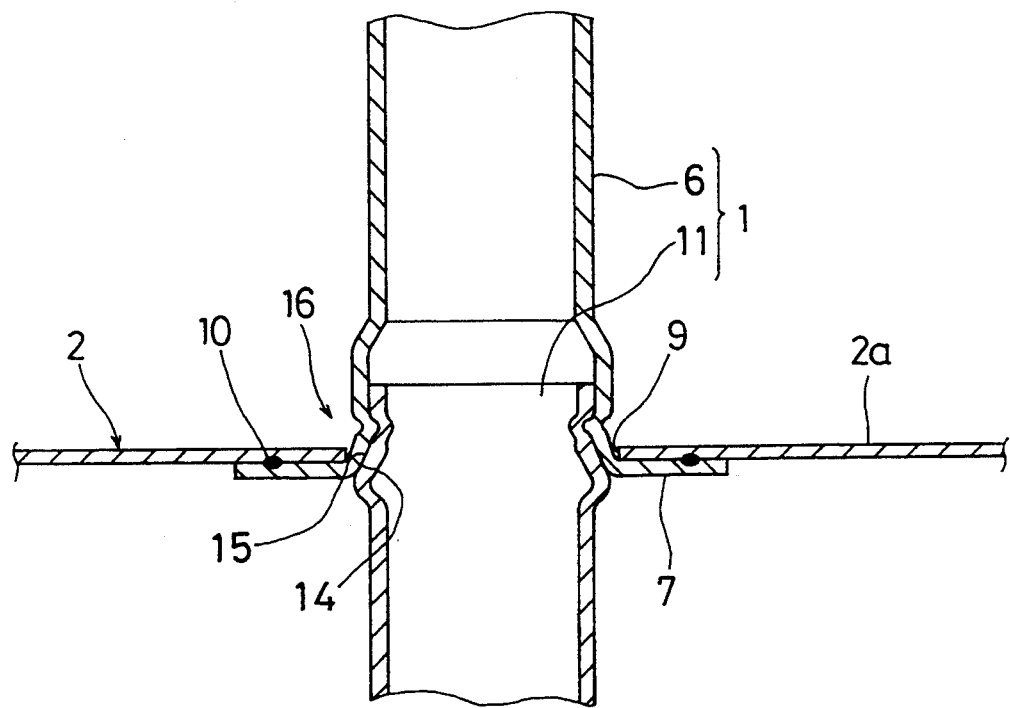
FIG. 5 is a view corresponding to FIG. 3 according to a third embodiment of the present invention.

FIG. 5 shows the third embodiment of the present invention. In this embodiment, a part of the inner periphery of the end part of the outer pipe 7 on the flange 6 side is formed as a caulking part 16 so as to annularly, entirely adhere to the outer periphery of the end part of the inner pipe 11 on the outer pipe 6 side. Thus, the caulking part 16 serves as the sealing means.

In detail, the inner periphery at the open end of the outer pipe 6 on the flange 7 side is formed as a tapered inner peripheral part 14, as well as in the second embodiment, which slightly increases in an inner diameter toward the opening. The inner diameter of the inner periphery from the tapered inner peripheral part 14 up to a part which is a set distance apart therefrom is slightly larger than a primary outer diameter of the inner pipe 11. The entire outer periphery of the inner pipe 11 near the open end is swelled outward in a radial direction. The swelled outer periphery serves as a tapered outer peripheral part 15 adhering to the tapered inner peripheral part 14 in such a fashion that the upper end of the inner pipe 11 is inserted in the outer pipe 6.

Under the condition that the upper end of the inner pipe 11 is inserted in the open end of the outer pipe 6 on the flange 7 side, the tapered outer peripheral part 15 of the inner pipe 11 is adhered to the inner peripheral part 14 of the outer pipe 6. When an overlap portion of the outer pipe 6 and the inner pipe 11 is firmly, entirely caulked inward in the radial direction under the adhered condition, the caulked portion of the outer pipe 6 is entirely recessed inward so as to form the caulking part 16 at the outer pipe 6. At this time, the inner periphery of the caulking part 16 is entirely adhered and pressed to the outer periphery of the inner pipe 11, with a result that both pipes 6, 11 are excellently sealed at the respective inner/outer peripheries under the adhered and pressed condition without the sealing member 12 such as the O-ring in the first embodiment.

In this embodiment, the caulking part 16 also seals by the adhesion between the tapered outer peripheral pare 15 of the inner pipe 11 and the tapered inner peripheral part 14 of the outer pipe 6, thus enhancing the sealability between both pipes 6, 11.

Since the outer pipe 6 is caulked, the inner pipe 11 at the portion pressed by the inner periphery of the caulking part 16 is entirely recessed inward in the radial direction, so that the caulking part 16 is insert in the recessed portion. Accordingly, the inner pipe 11 is fixed to the outer pipe 6. Thus, the caulking part 16 functions as means for holding the inner pipe 11, while serving as the sealing means between the both pipes 6, 11. As a result, the number of parts is reduced, removing the bracket 13 as the holding means in first and second embodiments.

In each embodiment, the flange 7 of the outer pipe 6 is jointed from the inside of the fuel tank 2 to the wall part 2a of the tank 2 around the through hole 9. However, the flange 7 of the outer pipe 6 may be jointed from the outside of the fuel tank 2 to the wall part 2a.

Further, in each embodiment, the present invention is applied to the joint structure of the breather pipe 1 and the fuel tank 2. It is of course applicable to a joint structure of a metallic pipe other than the breather pipe 1 and the metallic container other than the fuel tank 2 for maintaining excellently the sealability and the joint strength.

We claim:

1. A joint structure of a metallic container and a metallic pipe extending and passing through a wall part of the container, said metallic pipe comprising:
   an outer pipe arranged outside of and having a first end extending and passing through said wall of said container and including an integrally formed flange on said first end, said flange positioned adjacent said container wall part and connected to said wall part via an annular projection weld;
   an inner pipe arranged inside of said container and having a first end extending and passing through said wall part of said container and inserted into said first end of said outer pipe;
   said inner pipe supported from said wall part of said container by means of a bracket; and
   the inner periphery of said first end of said outer pipe and the outer periphery of said first end of said inner pipe being in sealing relationship.

2. The joint structure according to claim 1, including an O-ring interposed between the inner periphery of said outer pipe and the outer periphery of said inner pipe for forming said sealed relationship.

3. The joint structure according to claim 1, wherein said outer pipe further comprises a tapered first end portion adjacent said flange whereby said outer pipe increases in inner diameter toward its first end; and
   said inner pipe comprises a tapered first end portion whereby said inner pipe decreases in outer diameter toward its first end;
   the taper of the outer diameter of the inner pipe corresponding to the taper of the inner diameter of the outer pipe such that said correspondingly tapered pipe portions sealingly engage with said inner pipe inserted into said outer pipe.

4. The joint structure according to claim 1, wherein said flange on said outer pipe is projection-welded to an inside surface of the wall part of the container.

5. The joint structure according to claim 1, wherein said metallic container is a fuel tank for storing liquid fuel, and said metallic pipe is a breather pipe extending and passing through the wall part of said fuel tank.

6. A joint structure of a metallic container and a metallic pipe extending and passing through a wall part of the container, said metallic pipe comprising:

an outer pipe arranged outside of and having a first end extending and passing through said wall of said container and including an integrally formed flange on said first end, said flange positioned adjacent said container wall part and connected to said wall part via an annular projection weld;

an inner pipe arranged inside of said container and having a first end extending and passing through said wall part of said container and inserted into said first end of said outer pipe;

said outer pipe comprising a first end portion adjacent said flange having an inner peripheral surface in contacting sealing engagement about its entire periphery with an outer peripheral surface of said first end portion of said inner pipe, and means for retaining said inner pipe within said outer pipe;

said means and said inner pipe being supported along its first end portion by said first end portion of said outer pipe.

7. The joint structure according to claim 6, wherein said first end portion of said outer pipe adjacent said flange is tapered whereby said outer pipe increases in inner diameter toward its first end, said first end portion of said inner pipe is tapered whereby said inner pipe decreases in outer diameter toward its first end and the taper of the outer diameter of the inner pipe corresponds to the taper of the inner diameter of the outer pipe such that said correspondingly tapered pipe portions sealingly engage with said inner pipe inserted into said outer pipe.

8. The joint structure according to claim 6, wherein said flange on said outer pipe is projection-welded to an inside surface of the wall part of the container.

9. The joint structure according to claim 6, wherein said metallic container is a fuel tank for storing liquid fuel, and said metallic pipe is a breather pipe extending and passing through the wall part of the fuel tank.

10. The joint structure according to claim 6, wherein said means for retaining includes annular radial projections on the inner peripheral surface of said first end portion of said outer pipe interlocking with annular radial recesses on the outer peripheral surface of said first end portion of said inner pipe.

* * * * *